United States Patent
Hatanaka et al.

(10) Patent No.: US 10,900,893 B2
(45) Date of Patent: Jan. 26, 2021

(54) METHOD OF MEASURING HEIGHT OF WATER ON ICE

(71) Applicant: BRIDGESTONE CORPORATION, Tokyo (JP)

(72) Inventors: Shintaro Hatanaka, Tokyo (JP); Yasuo Ohsawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/520,783

(22) Filed: Jul. 24, 2019

(65) Prior Publication Data

US 2019/0346365 A1    Nov. 14, 2019

Related U.S. Application Data

(63) Continuation of application No. PCT/JP2018/001832, filed on Jan. 22, 2018.

(30) Foreign Application Priority Data

Jan. 27, 2017    (JP) .................. 2017-013671

(51) Int. Cl.
- *G01N 21/3581* (2014.01)
- *G01B 11/06* (2006.01)
- *G01N 21/3563* (2014.01)

(52) U.S. Cl.
CPC .......... *G01N 21/3581* (2013.01); *G01B 11/06* (2013.01); *G01N 21/3563* (2013.01)

(58) Field of Classification Search
CPC . G01N 21/3581; G01N 21/3563; G01B 11/06
See application file for complete search history.

(56) References Cited

U.S. PATENT DOCUMENTS

| | | | |
|---|---|---|---|
| 4,578,959 A | 4/1986 | Alsenz | |
| 4,797,660 A | 1/1989 | Rein, Jr. | |
| 9,689,796 B2 * | 6/2017 | Van Mechelen | ... G01B 11/0625 |
| 2003/0226969 A1 * | 12/2003 | Williamson | ....... G01N 21/3563 |
| | | | 250/341.1 |
| 2011/0127433 A1 * | 6/2011 | Spennemann | ..... G01N 21/3554 |
| | | | 250/341.8 |

(Continued)

FOREIGN PATENT DOCUMENTS

| | | |
|---|---|---|
| CN | 103278083 A | 9/2013 |
| CN | 106225664 A | 12/2016 |

(Continued)

OTHER PUBLICATIONS

International Preliminary Report on Patentability and the Translation of the Written Opinion, dated Jul. 30, 2019, from the International Bureau in international application No. PCT/JP2018/001832.

(Continued)

*Primary Examiner* — Edwin C Gunberg
(74) *Attorney, Agent, or Firm* — Sughrue Mion, PLLC (57) ABSTRACT

A method of measuring a height of water on ice of the present disclosure comprises emitting terahertz radiation having a frequency of 10 THz or less toward a first surface of the ice; and measuring transmitted or reflected radiation of the terahertz radiation to measure the height of the water on the ice from a result of the measurement.

20 Claims, 7 Drawing Sheets

(56) References Cited

U.S. PATENT DOCUMENTS

2013/0212904 A1* 8/2013 Adachi ................ F26B 25/22
                                                        34/573
2014/0166883 A1   6/2014 Ono et al.
2015/0316475 A1* 11/2015 Rahman ............ G01N 33/4833
                                                    250/339.02

FOREIGN PATENT DOCUMENTS

| DE | 41 41 446 C1    | 2/1993  |
|----|-----------------|---------|
| DE | 102011100907 A1 | 1/2012  |
| EP | 0898148 A2      | 2/1999  |
| EP | 2522985 A2      | 11/2012 |
| JP | 2003-518617 A   | 6/2003  |
| JP | 4176586 B2      | 11/2008 |
| JP | 2009-186333 A   | 8/2009  |
| JP | 2010-210324 A   | 9/2010  |
| JP | 2010-249693 A   | 11/2010 |
| JP | 2015-001379 A   | 1/2015  |
| JP | 2015-087270 A   | 5/2015  |

OTHER PUBLICATIONS

International Search Report for PCT/JP2018/001832 dated, Apr. 10, 2018 (PCT/ISA/210).
Communication dated Jul. 23, 2020, from The China National Intellectual Property Administration in Application No. 201880008334.X.
Extended European Search Report dated Oct. 2, 2020 from the European Patent Office in Application No. 18744830.3.

* cited by examiner

METHOD OF MEASURING HEIGHT OF WATER ON ICE

TECHNICAL FIELD

The present disclosure relates to a method of measuring a height of water on ice.

BACKGROUND

As a technique to measure the height of water on a road surface, a method is known which includes emitting electromagnetic radiation toward the road surface and measuring the height of water on the road surface from the attenuation of the electromagnetic radiation (for example, see Patent Literature 1).

CITATION LIST

Patent Literature (PTL) 1: JP 4176586 B

SUMMARY

Technical Problem

The above-described technique, however, has a difficulty in distinguishing substances having similar dielectric constants, such as ice and water, for example, and detecting water by distinguishing ice and water that are present on the road surface was difficult. In addition, ice and water also have similar indices of refraction of light, and hence distinguishing them using visible light is also difficult. Furthermore, when a water film on ice is thin, distinguishing them is difficult even with ultrasonic waves.

In light of such a background, an object of the present disclosure is to provide a method of measuring a height of water on ice which makes measurements of the height of water on ice possible with a simplified procedure.

Solution to Problem

The subject matter of the present disclosure is as follows:

A method of measuring a height of water on ice of the present disclosure comprises emitting terahertz radiation having a frequency of 10 THz or less toward a first surface of the ice; and measuring transmitted or reflected radiation of the terahertz radiation to measure the height of the water on the ice from a result of the measurement.

As used therein, the term "measuring a height of water on ice" includes obtaining a measurement result of the height of water of zero in the absence of water, and also includes determining the relative relationship of heights and detecting the presence or absence of water on ice, as well as obtaining the value of the height.

Advantageous Effect

In accordance with the present disclosure, a method of measuring a height of water on ice is provided which makes measurements of the height of water on ice possible with a simplified procedure.

DETAILED DESCRIPTION

Hereinafter, embodiments of the present disclosure will be described with reference to the drawings.

Figure 1:
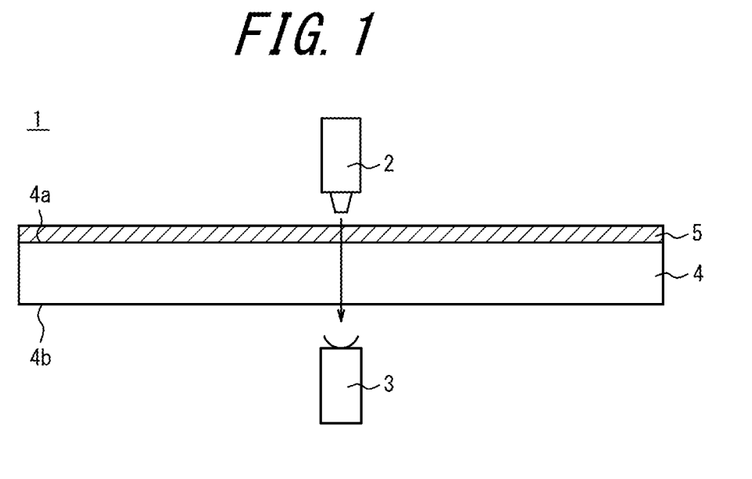
FIG. 1 is a diagram schematically depicting a water-on-ice height measurement apparatus that can be used for a method of measuring a height of water on ice in accordance with a first embodiment of the present disclosure.

FIG. 1 is a diagram schematically depicting a water-on-ice height measurement apparatus that can be used for a method of measuring a height of water on ice in accordance with a first embodiment of the present disclosure. This apparatus 1 for measuring a height of water on ice includes an emission device 2 that emits terahertz radiation having a frequency of 10 THz or less (preferably, a frequency of 0.1 THz or more and 10 THz or less), and a transmitted radiation measurement device 3 that detects and measures transmitted radiation of the terahertz radiation. In the embodiment depicted in FIG. 1, the emission device 2 and the transmitted radiation measurement device 3 are disposed so as to face each other, having ice 4 with a first surface 4a and a second surface 4b that is opposite to the first surface 4a interposed therebetween. In other words, in the embodiment depicted in FIG. 1, the emission device 2 is disposed outside the ice 4 on the side of the first surface 4a of the ice 4 (above the ice 4 in FIG. 1), whereas the transmitted radiation measurement device 3 is disposed outside the ice 4 on the side of the second surface 4b of the ice 4 (below the ice 4 in FIG. 1). In the method of the first embodiment, terahertz radiation having frequency of 10 THz or less (preferably, a frequency of 0.1 THz or more and 10 THz or less) is emitted by the emission device 2 toward the first surface 4a. The terahertz radiation passes through water 5 (if present), and then passes through the ice 4, in this order. The transmitted radiation of the terahertz radiation is then measured by the transmitted radiation measurement device 3. Although the emission of the terahertz radiation by the emission device 2 and the measurement of the transmitted radiation by the transmitted radiation measurement device 3 are conducted on a line (at a point in plan view) in the depicted example, they may be conducted on a plane or at a point. This is also applicable to second to fourth embodiments described below (note that a measurement is performed by the transmitted radiation measurement device 3 in a second embodiment whereas measurements are performed by reflected radiation measurement device 6 that detects and measures reflected radiation of terahertz radiation in third to fourth embodiments). Note that, when a measurement is performed on a line or on a plane, the measurement may be performed entirely or locally. For example, when the heights are measured entirely, appropriate calculations may be performed, including determining the average, the maximum, or the minimum.

Figure 2:
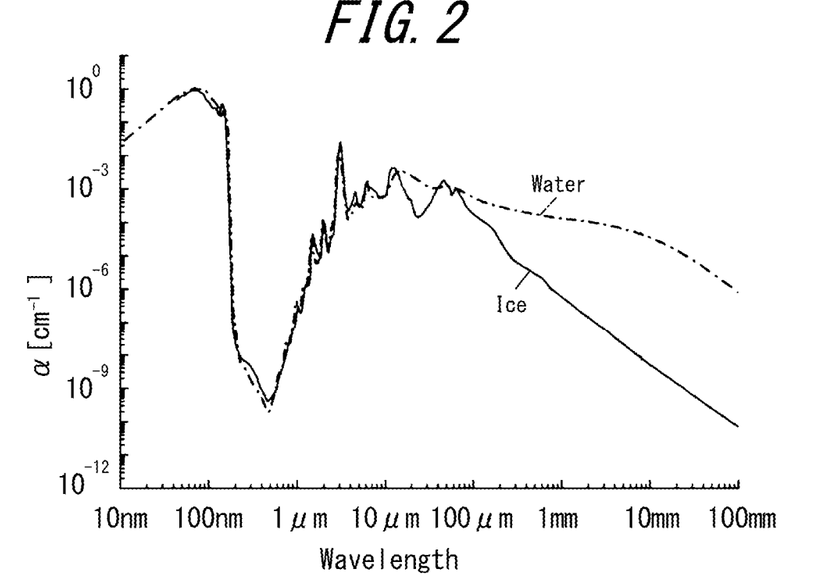
FIG. 2 is a diagram indicating the relationship between wavelengths of electromagnetic radiation and the absorption properties to ice and water of the electromagnetic radiation.

FIG. 2 is a diagram indicating the relationship between wavelengths of electromagnetic radiation and the absorption properties to ice and water of the electromagnetic radiation (source: The Optical Society of Japan, *Japanese Journal of Optics*, pp. 485-486, Vol. 36 No. 8 (2007), Optical Science and Optical Technology Research Committee). In FIG. 2, the label "$\alpha^{-1}$" on the vertical axis indicates the absorptivities of electromagnetic radiation to ice and water. As depicted in FIG. 2, while there is no difference in the absorption properties in the wavelength region of 360 nm to 830 nm, which is the wavelength region of visible light, the distinguishable differences appear between the absorption properties of electromagnetic radiation of ice and water at wavelengths of terahertz radiation (frequencies of 0.1 THz to 10 THz; i.e., wavelengths of 30 μm to 3 mm) or longer. In other words, the intensity of transmitted radiation of the terahertz radiation decreases as water on ice increases. Hence, in accordance with the first embodiment, the height of the water 5 on the ice 4 can be measured from the above-described measurement result of the transmitted radiation (e.g., the reduction in the intensity thereof). For example, a measurement is performed with the method of this embodiment after predetermined time elapses from the initial state where water 5 is absent on the ice 4. If any reduction in the intensity is detected in the measured terahertz radiation (e.g., caused by melting of the ice 4 during the predetermined time), it can be considered that a water film of a certain thickness has been formed. Then, if a similar measurement is performed after the predetermined time and a further reduction is detected in the measured terahertz radiation, it can be considered that the water film has thickened (due to further melting and the like). On the other hand, if the intensity of terahertz radiation has not demonstrated any reduction after the predetermined time, for example, it can be considered that no water film has been formed (i.e., the height of water is zero). Thus, in accordance with the method of measuring a height of water on ice of this embodiment, the height of water on ice can be measured with a simplified procedure.

Figure 3:
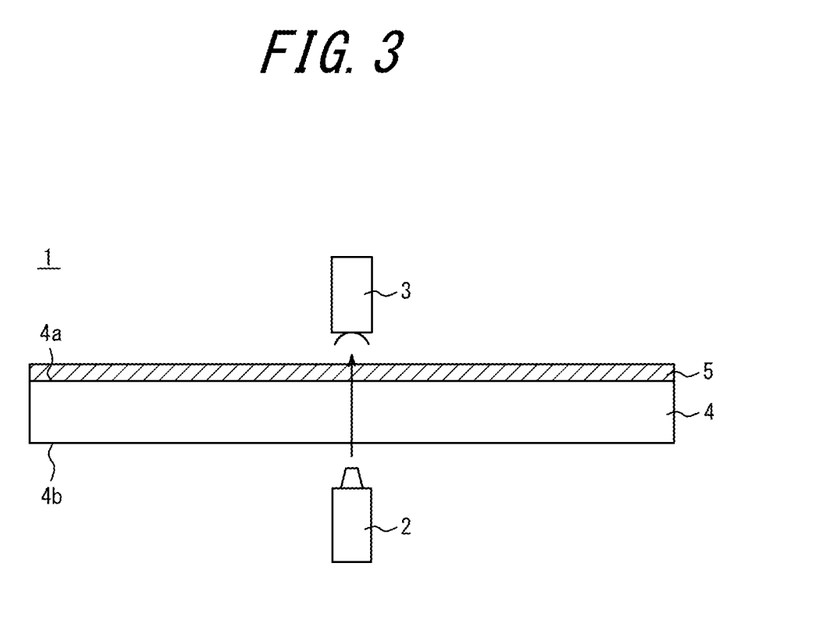
FIG. 3 is a diagram schematically depicting a water-on-ice height measurement apparatus that can be used for a method of measuring a height of water on ice in accordance with a second embodiment of the present disclosure.

FIG. 3 is a diagram schematically depicting a water-on-ice height measurement apparatus that can be used for a method of measuring a height of water on ice in accordance with a second embodiment of the present disclosure. This measurement apparatus used in the second embodiment is different from that of the first embodiment in that the emission device 2 is disposed outside the ice 4 on the side of the second surface 4b of the ice 4 (below the ice 4 in FIG. 3), while the transmitted radiation measurement device 3 is disposed outside the ice 4 on the side of the first surface 4a of the ice 4 (above the ice 4 in FIG. 3). In the second embodiment, terahertz radiation having frequency of 10 THz or less (preferably, a frequency of 0.1 THz or more and 10 THz or less) is emitted by the emission device 2 toward the second surface 4b. The transmitted radiation of the terahertz radiation is then measured by the transmitted radiation measurement device 3. The order of transmissions of the terahertz radiation in the second embodiment is different in that ice 4 is the first and the water 5 (if present) is the next, but the intensity of transmitted radiation of the terahertz radiation reduces as the water 5 increases also in the second embodiment. Similarly to the first embodiment, the height of the water on the ice, therefore, can be measured with a simplified procedure.

Figure 4:
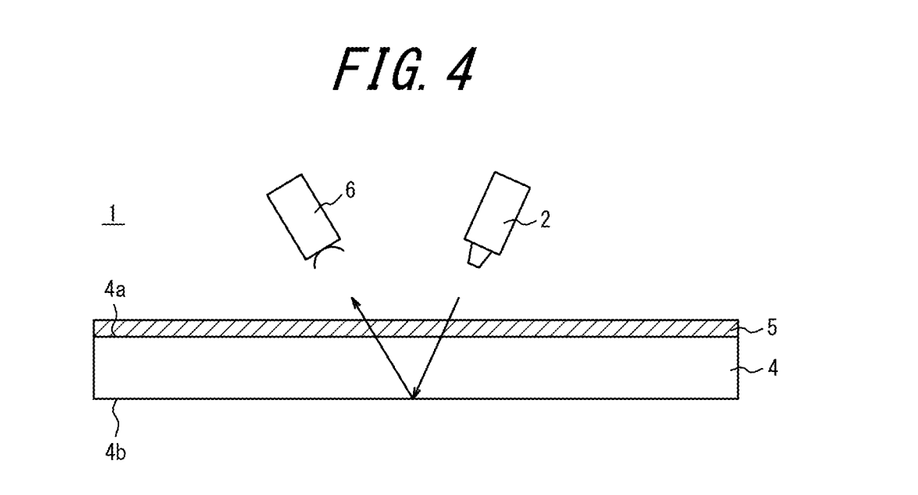
FIG. 4 is a diagram schematically depicting a water-on-ice height measurement apparatus that can be used for a method of measuring a height of water on ice in accordance with a third embodiment of the present disclosure.

FIG. 4 is a diagram schematically depicting a water-on-ice height measurement apparatus that can be used for a method of measuring a height of water on ice in accordance with a third embodiment of the present disclosure. As depicted in FIG. 4, reflected radiation measurement device 6 is used in place of the transmitted radiation measurement device 3 in the third embodiment, and the third embodiment is different from the first embodiment in that both the emission device 2 and the reflected radiation measurement device 6 are disposed outside the ice 4 on the side of the first surface 4a of the ice 4 (above the ice 4 in FIG. 4). In the third embodiment, terahertz radiation having frequency of 10 THz or less (preferably, a frequency of 0.1 THz or more and 10 THz or less) is emitted by the emission device 2 toward the first surface 4a. As depicted in FIG. 4, the emitted terahertz radiation passes through water 5 (if present), then enters the ice 4, is reflected by the second surface 4b of the ice 4, and passes through the ice 4 and the water 5 (if present). The reflected radiation of the terahertz radiation is then measured by the reflected radiation measurement device 6. Although the terahertz radiation passes through the ice 4 and the water 5 (if present) twice, the intensity of the reflected radiation of the terahertz radiation reduces as the water increases also in the third embodiment. Similarly to the first embodiment, the height of the water on the ice, therefore, can be measured with a simplified procedure.

Figure 5:
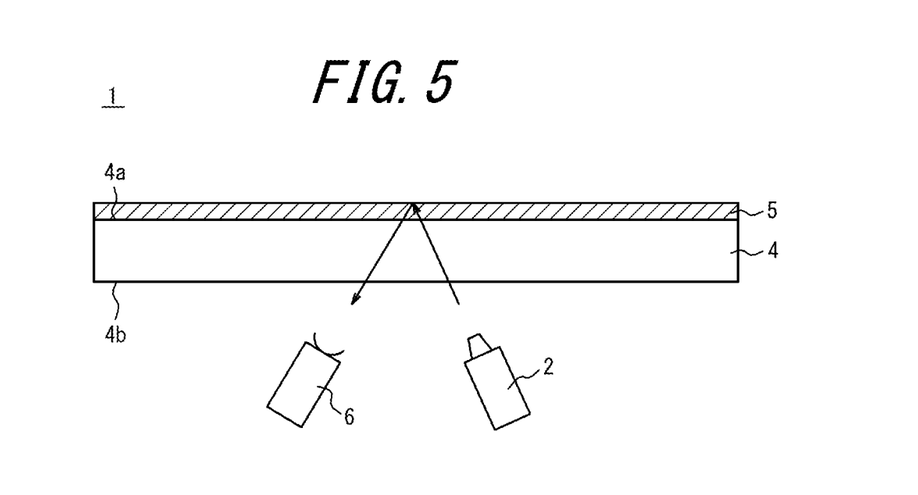
FIG. 5 is a schematic diagram for illustrating a measurement of a height of water on ice using a water-on-ice height measurement apparatus that can be used for a method of measuring a height of water on ice, in accordance with a fourth embodiment of the present disclosure.

FIG. 5 is a diagram schematically depicting a water-on-ice height measurement apparatus that can be used for a method of measuring a height of water on ice in accordance with a fourth embodiment of the present disclosure. As depicted in FIG. 5, the fourth embodiment is different from the third embodiment in that both the emission device 2 and the reflected radiation measurement device 6 are disposed outside the ice 4 on the side of the second surface 4b of the ice 4 (below the ice 4 in FIG. 5). In the fourth embodiment, terahertz radiation having frequency of 10 THz or less (preferably, a frequency of 0.1 THz or more and 10 THz or less) is emitted by the emission device 2 toward the second surface 4b. As depicted in FIG. 5, in the presence of water 5, the emitted terahertz radiation enters the water 5 from the ice 4, is then reflected by the first surface of the water 5, and passes through the water 5 and the ice 4 again. Note that, if water 5 is not present, the emitted terahertz radiation would pass through the ice 4 and be reflected by the first surface 4a of the ice 4. The reflected radiation of the terahertz radiation is then measured by the radiation measurement device 6. In the fourth embodiment, the height of the water on the ice can be measured with a simplified procedure similarly to the third embodiment because only the order to pass the ice 4 and the water 5 (if present) is different from that in Example 3.

As in the first to fourth embodiments, the height of the water 5 on the ice 4 can be measured in a simplified manner by emitting terahertz radiation having frequency of 10 THz or less (preferably, a frequency of 0.1 THz or more and 10 THz or less) toward the first surface 4a or the second surface 4b of the ice 4; and measuring the transmitted radiation or reflected radiation of the terahertz radiation to measure the height of the water 5 on the ice 4 from a result of the measurement.

In the present disclosure, preferably, terahertz radiation is emitted toward the first surface 4a of the ice 4 from outside the side of the second surface 4b of the ice 4, or terahertz radiation is emitted to the first surface 4a from inside the ice 4a, transmitted or reflected radiation of the terahertz radiation is measured to measure the height of the water 5 on the first surface 4a of the ice 4 from a result of the measurement.

Figure 6A:
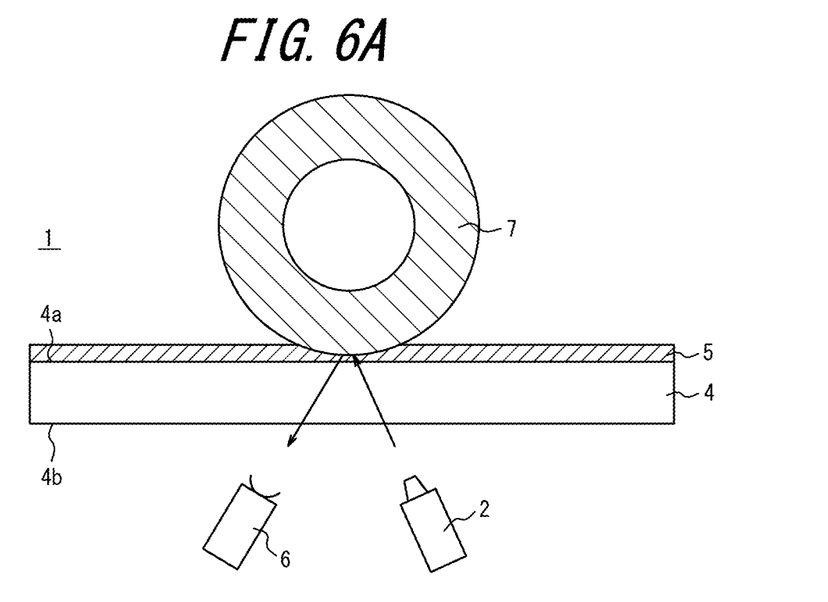
FIGS. 6A and 6B are diagrams schematically depicting a water-on-ice height measurement apparatus that can be used for a method of measuring a height of water on ice accordance with the fourth embodiment of the present disclosure.
Figure 6B:
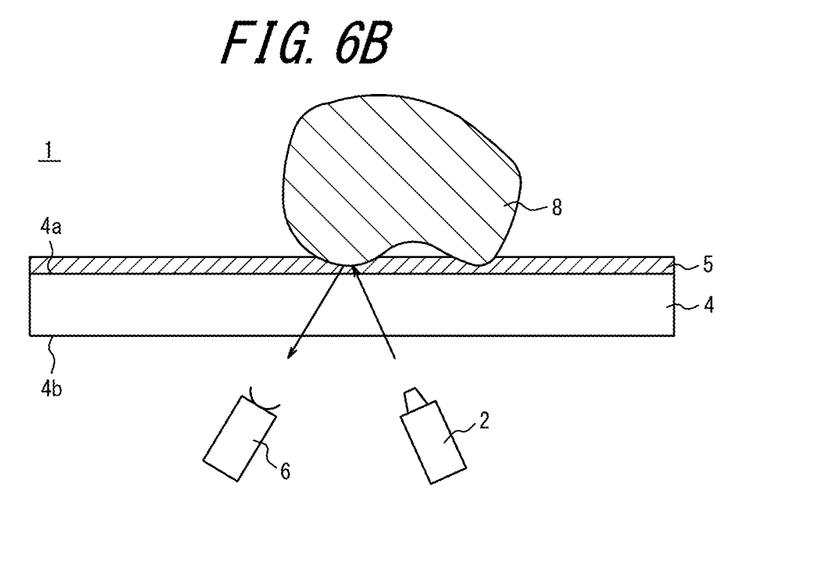

FIGS. 6A and 6B are diagrams schematically depicting a water-on-ice height measurement apparatus used a method of measuring a height of water on ice in accordance with a fourth embodiment of the present disclosure. In FIG. 6A, a tire 7 is placed on a first surface 4a of ice 4. In the embodiment depicted in FIG. 6A, terahertz radiation is emitted toward the first surface 4a of the ice 4 by the emission device 2 from outside the side of the second surface 4b of the ice 4 (the bottom part of FIG. 6A) while the tire 7 is placed on the first surface 4a of the ice 4. The emitted terahertz radiation passes through the ice 4, then passes through the water 5 (if present), and is reflected by the tire 7. The reflected radiation of terahertz radiation passes through water 5 (if present) and the ice 4 in this order. The reflected radiation of the terahertz radiation from the tire 7 is then measured by the reflected radiation measurement device 6 to measure the height of the water 5 between the ice 4 and the tire 7 from a result of the measurement. In accordance with the embodiment depicted in FIG. 6A, the height of the water 5 that is present between the ice 4 and the tire 7 can be measured.

FIG. 6B is different from FIG. 6A in that a rubber block 8 is placed on a first surface 4a of the ice 4. Similar advantageous effects can be achieved with the rubber block 8 by the similar technique to the technique with the tire 7 in FIG. 6A.

In the second and fourth embodiments, similar advantageous effects can be achieved by emitting terahertz radiation to the first surface 4a of the ice 4 from inside the ice 4, such as by disposing the emission device 2 inside the ice 4.

As in the embodiments depicted in FIGS. 6A and 6B, in the present disclosure, upon measuring the height of water between an object and ice, preferably, terahertz radiation is emitted toward the first surface 4a of the ice 4 from outside the side of the second surface 4b of the ice 4 or terahertz radiation is emitted toward the first surface 4a from inside the ice 4 while an object is placed on the first surface 4a of the ice 4, the reflected radiation of the terahertz radiation from the object is measured to measure the height of the water 5 between the ice 4 and the object from a result of the measurement. This is preferred because the height of the water 5 that is present between the ice 4 and the object can be measured. In the present disclosure, the object is preferably made from a rubber. This is preferred because the height of the water 5 that is present between the ice 4 and the rubber can be measured. Furthermore, in the present disclosure, the object is preferably one of a tire, a rubber block, and a rubber sheet. This is preferred because the height of the water 5 that is present between the ice 4 and one of the tire 7, the rubber block 8, and the rubber sheet can be measured.

In the embodiment depicted in FIG. 6A, the tire 7 can be displaced relative to the ice 4. For example, the above-described measurement may be performed while the ice 4 is being displaced and the tire 7 rotatable about the tire axis is kept at rest. This enables a measurement of the thickness of a water film when the tire 7 rolls on the ice 4. As a matter of course, the ice 4 may be kept at rest, and the tire 7 may be rotated or displaced such that the tire 7 rolls on the ice 4. Alternatively, the tire 7 may be rotated or displaced while the ice 4 is being displaced. In any case, the emission device 2 and the reflected radiation measurement device 6 may be fixed or may be displaced. In these cases, any of well-known apparatuses may be used to displace or rotate the tire 7, the ice 4, the emission device 2, or the reflected radiation measurement device 6. In the embodiment depicted in FIG. 6B, the rubber block 8 may be displaced relative to the ice 4. For example, the above-described measurement may be performed while the ice 4 is being displaced and the rubber block 8 is kept at rest. This enables the thickness of water film to be measured when the rubber block 8 moves on the ice 4. As a matter of course, the ice 4 may be kept at rest, and the rubber block 8 may be displaced. Alternatively, the rubber block may be displaced while the ice 4 is being displaced. In any case, the emission device 2 and the reflected radiation measurement device 6 may be fixed or may be displaced. In these cases, any of well-known apparatuses may be used to displace the rubber block 8, the ice 4, the emission device 2 or the reflected radiation measurement device 6. This is also applicable to the rubber sheet or any other objects.

Figure 7:
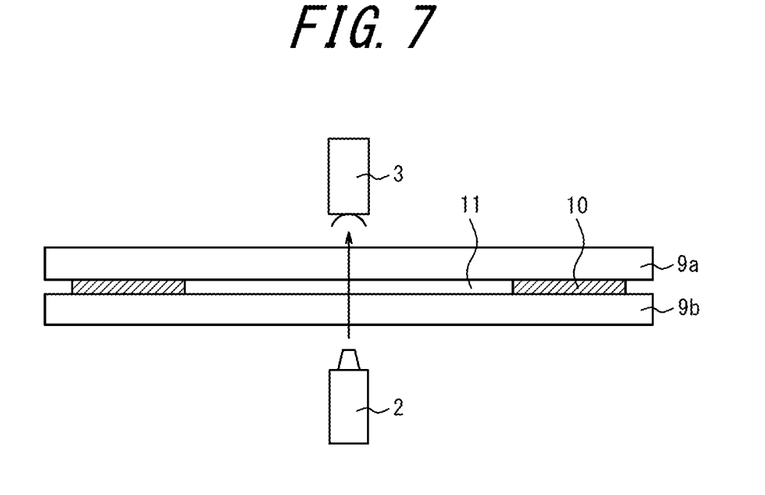
FIG. 7 is a schematic diagram for illustrating how to obtain the relationship between the height of water and the intensity of transmitted radiation of terahertz radiation in advance.
Figure 8:
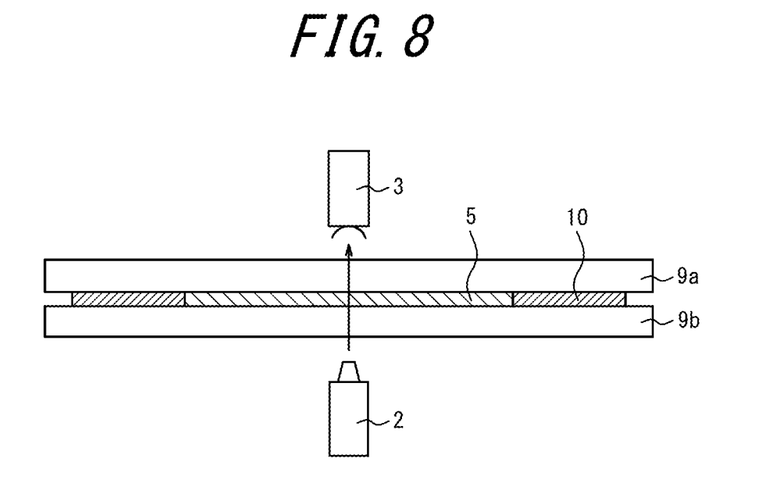
FIG. 8 is a schematic diagram for illustrating how to obtain the relationship between the height of water and the intensity of transmitted radiation of terahertz radiation in advance.

FIGS. 7 and 8 are schematic diagrams for illustrating how to obtain the relationship between the height of water and the intensity of transmitted radiation of terahertz radiation in advance. As depicted in FIG. 7, transparent plates 9a, 9b transparent to terahertz radiation are disposed so as to face each other, having spacers 10 sandwiched between the transparent plates 9a, 9b. As the transparent plates 9a, 9b, plates made from glass and an acrylic, and a polycarbonate, and plate-like ice are used, for example. Air 11 is present inside the space enclosed by the transparent plates 9a, 9b and the spacers 10. In the illustrated example, the terahertz-wave emission device 2 is disposed outside the ice 4 on the side of the transparent plate 9b, and the transmitted radiation measurement device 3 is disposed outside the ice 4 on the side of the transparent plate 9a. Alternatively, the emission device 2 may be disposed outside the ice 4 on the side of the transparent plate 9a, and the transmitted radiation measurement device 3 may be disposed outside the ice 4 on the side of the transparent plate 9b. Terahertz radiation is then emitted by the emission device 2, and the intensity of transmitted radiation of the terahertz radiation in the absence of water is measured by the transmitted radiation measurement device 3 in advance.

Next, as depicted in FIG. 8, the space enclosed by the transparent plates 9a, 9b and the spacers 10 is filled with water 5. The water 5 is filled to the height equal to the thickness of the spacers 10, and accordingly the height of the water 5 can be adjusted by adjusting the thickness of the spacers 10. Terahertz radiation is then emitted by the emission device 2, and the intensity of transmitted radiation of the terahertz radiation is measured by the transmitted radiation measurement device 3 in the presence of water in a known height (the height same as that of the spacers 10).

Then, by determining the difference between the intensities of the transmitted radiation of the terahertz radiation in the two cases in FIGS. 7 and 8, the reduction in the intensity of the transmitted radiation of the terahertz radiation in the presence of the water 5 of the known height can be determined. Note that, preferably, the spacers 10 of different thicknesses may be provided and reductions in the intensity of the transmitted radiation of the terahertz radiation may be determined for various heights of the water 5, from the viewpoint of enhancing the accuracy of measurements of the height of the water 5.

Figure 9:
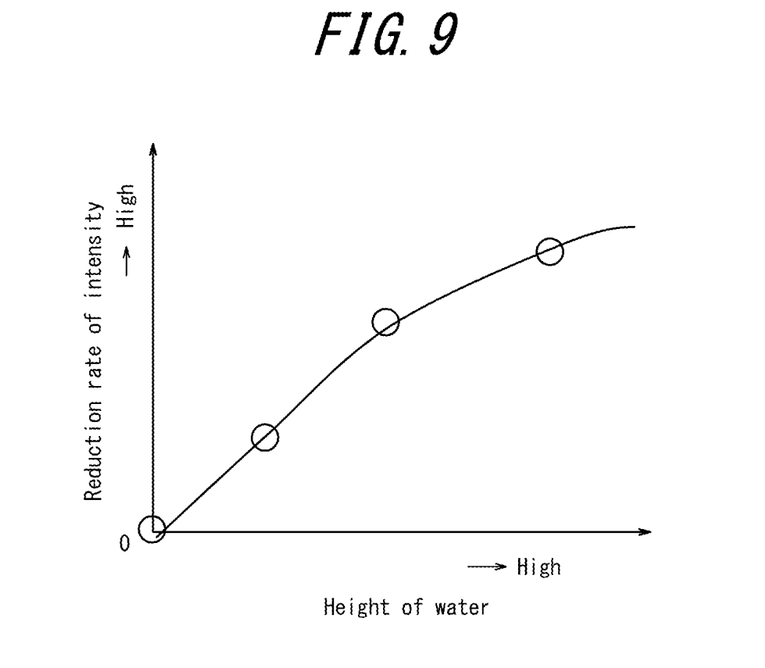
FIG. 9 is a diagram indicating the relationship between the height of water and a reduction rate of the intensity of transmitted radiation of terahertz radiation.

FIG. 9 is a diagram indicating the relationship between the height of water and a reduction rate of the intensity of transmitted radiation of terahertz radiation. As one example, the relationship between the height of water and a reduction rate of the intensity of transmitted radiation of terahertz radiation as the one depicted in FIG. 9 can be obtained using the technique depicted in FIGS. 7 and 8. In the first and third embodiments, an absolute value of the height of the water 5 on the ice 4 can then be calculated based on an intensity of transmitted radiation of terahertz radiation measured and this relationship.

Figure 10:
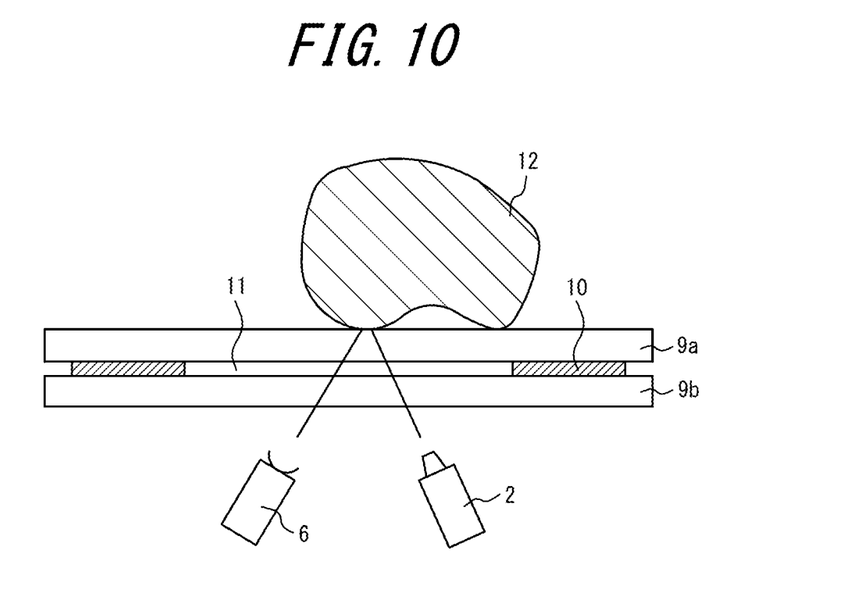
FIG. 10 is a schematic diagram for illustrating how to obtain the relationship between the height of water and the intensity of reflected radiation of terahertz radiation.
Figure 11:
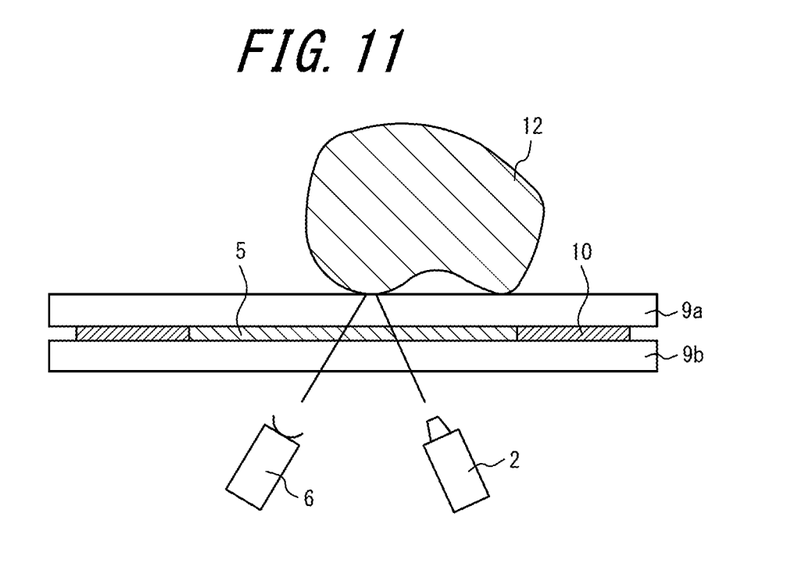
FIG. 11 is a schematic diagram for illustrating how to obtain the relationship between the height of water and the intensity of reflected radiation of terahertz radiation.

FIGS. 10 and 11 are schematic diagrams for illustrating how to obtain the relationship between the height of water and the intensity of reflected radiation of terahertz radiation. As depicted in FIG. 10, the transparent plates 9a, 9b transparent to terahertz radiation are disposed so as to face each other, having the spacers 10 sandwiched between the transparent plates 9a, 9b. Air 11 is present inside the space enclosed by the transparent plates 9a, 9b and the spacers 10. An object 12 is placed on one transparent plate 9a. In the illustrated example, both the terahertz-wave emission device 2 and the reflected radiation measurement device 6 are disposed outside the ice 4 on the side of the transparent plate 9b. Terahertz radiation is then emitted by the emission device 2, and the intensity of reflected radiation of the terahertz radiation in the absence of water is measured by the reflected radiation measurement device 6 in advance.

Next, as depicted in FIG. 11, the space enclosed by the transparent plates 9a, 9b and the spacers 10 is filled with the water 5. The water 5 is filled to the height equal to the thickness of the spacers 10, and accordingly the height of the water 5 can be adjusted by adjusting the thickness of the spacers 10. Terahertz radiation is then emitted by the emission device 2, and the intensity of reflected radiation of the terahertz radiation is measured by the reflected radiation measurement device 6 in the presence of water of known height (the height same as that of the spacers 10). Then, by determining the difference between the intensities of the reflected radiation of the terahertz radiation in the two cases in FIGS. 10 and 11, the reduction in the intensity of the reflected radiation of the terahertz radiation reflected by the object 12 in the presence of the water 5 of the known height can be obtained. Note that, preferably, the spacers 10 of different thicknesses may be provided and reductions in the intensity of the reflected radiation of the terahertz radiation may be measured for various heights of the water 5, from the viewpoint of enhancing the accuracy of measurements of the height of the water 5. The object 12 is preferably any of objects those used in actual measurements, such as the tire 7 or the rubber block 8 as in the fourth embodiment, for example, and the object 12 preferably has the same surface roughness (this is applicable to examples in FIGS. 7 and 8). Note that this technique can be used without the object 12. In addition, when plate-like ice is used as the transparent plates 9a, 9b, the sum of the thicknesses of the transparent plates 9a, 9b is preferably set to be equal to the thickness of ice 4 in actual measurements. When objects other than ice are used as the transparent plates 9a, 9b, it is desirable to determine the transmittances to the ice 4 and the transparent plates 9a, 9b and to set the thickness of the plates to the value determined from the following formula. Note that, because ice and water have different absorptivities to terahertz radiation of different frequencies as depicted in FIG. 2, the frequency of terahertz radiation is preferably set to be the same as that used in actual measurements. Similarly, the intensity of terahertz radiation preferably is set to be the same as that used in actual measurements.

(Total thickness of transparent plates)=(Thickness of ice used in measurement)×(transmittance to ice)/(transmittance to transparent plate)   Formula 1:

In this manner, the relationship between the height of water and a reduction rate of the intensity of reflected radiation of terahertz radiation can be obtained. In the second, fourth, and fifth embodiments, an absolute value of the height of the water 5 on the ice 4 can be calculated more easily based on the measured intensity of reflected radiation of terahertz radiation and that relationship.

As described above, in the present disclosure, preferably, terahertz radiation having a frequency of 10 THz or less (preferably, a frequency of 0.1 THz to 10 THz) is emitted toward the first surface 4a of the ice 4 or the second surface 4b of the ice 4, reflected radiation of the terahertz radiation is measured, and an intensity of the reflected radiation is measured to measure the height of the water 5 on the ice 4 from a result of the measurement. This is preferred because the height of water on ice can be calculated more easily.

Further, in the present disclosure, preferably, the relationship between the height of water 5 and the intensity of transmitted or reflected radiation of terahertz radiation is obtained in advance, by emitting terahertz radiation to water 5 in a known height, and measuring the intensity of transmitted or reflected radiation of the terahertz radiation to measure the height of water 5 on the ice 4 using the relationship obtained in advance. This is preferred because an absolute value of the height of the water on ice can be calculated.

Alternatively, in the present disclosure, preferably, arrival time of reflected radiation is measured to measure the height of water 5 on the ice 4 from the speed of the terahertz radiation and the measured arrival time. This is preferred because the height of the water on the ice can also be measured further easily with this method. For example, the height of the water 5 can be measured in the example depicted in FIG. 6A by determining the difference between arrival time of reflected radiation from the tire 7 and arrival time of reflected radiation from the first surface 4a of the ice 4. This is preferred because the difference in the arrival time (time until reflected radiation is received) is caused by the difference in the traveling distance.

Further, in the present disclosure, preferably, measurements are performed by changing frequencies of terahertz radiation such that the measurement result include measurement results of the terahertz radiation of different frequencies. This is preferred because the height of water on ice can be measured more precisely by using the results of multiple frequencies.

Here, the minimum measurable height increases as the wavelength of terahertz radiation becomes longer. On the other hand, the difference in absorptivity of terahertz radiation between ice and water increases as the wavelength of terahertz radiation becomes longer, as depicted in FIG. 2. Accordingly, in the method of the present disclosure, the wavelength of terahertz radiation is preferably selected according to the size of water subjected to a height measurement. For example, for measuring water of a size of about 0.3 mm, the frequency of terahertz radiation may be set to about 1 THz. For measuring water in a size smaller than this size, terahertz radiation with a higher frequency may be used. For example, for observing the trend on the entire surface, terahertz radiation with a lower frequency may be used. In contrast, for observing details, terahertz radiation with a higher frequency may be used to provide a higher resolution. For example, in the example depicted in FIG. 6A, for measuring the thickness of a water film in the vicinity of a sipe in a block of a tire tread of the tire 7, a block edge, a small area divided by sipes, and the like, terahertz radiation with a higher frequency may be used.

EXAMPLES

Figure 12:
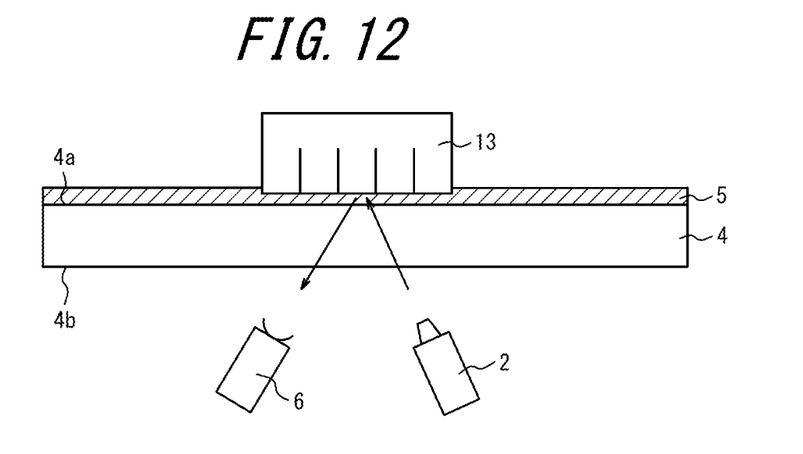
FIG. 12 is a diagram for illustrating Examples of the present disclosure.

FIG. 12 is a diagram for illustrating Examples of the present disclosure. A studless tire having a tire size of PSR195/65R15 is fabricated. A block of a tire tread of this studless tire has a width of 20 mm and a length of 25 mm in top view, the groove depth is 9 mm, the sipe depth is 5 mm, and the sipe width is 0.5 mm. The number of sipes is four, and the sipes are arranged at regular intervals of 6.25 mm. The tire is cut to the groove depth to obtain a single siped block 13. The siped block 13 is placed on plate-like ice 4 in 20 mm thick. Room temperature and the temperature of the ice are kept to −2° C., and a 100-N load is applied on the siped block 13. Initially, the siped block 13 is pressed against the plate-like ice 4, and then the plate-like ice 4 is displaced at a speed of 10 km/h while the siped block 13 is kept at rest to slide the siped block 13 on the plate-like ice 4 for 10 seconds.

As Comparative Example, visible light is emitted from below the plate-like ice 4 and reflected light is recorded with a video camera. In Example 1, 1-THz terahertz radiation is emitted to a point by the emission device 2, and reflected radiation of the terahertz radiation from that point is measured by the reflected radiation measurement device 6. In Example 2, 0.5-THz terahertz radiation is emitted to a point by the emission device 2, and reflected radiation of the terahertz radiation from that point is measured by the reflected radiation measurement device 6. In Example 3, 1-THz terahertz radiation is emitted on a plane by the emission device 2, and reflected radiation of the terahertz radiation on that plane is measured by the reflected radiation measurement device 6. In Examples 1-3, the intensities of the reflected radiation of the terahertz radiation are measured.

TABLE 1

| | Measurement results |
|---|---|
| Comparative Example | No difference is observed between intensities of emitted light and reflected light |
| Example 1 | Intensity of reflected radiation reduces |
| Example 2 | Intensity of reflected radiation reduces as compared to reduction in Example 1 |
| Example 3 | Intensity of reflected radiation reduces particularly at rear of forward direction of block |

As indicated in Table 1, in Conventional Example, no difference is observed between the intensities of emitted light and reflected light, and presence of water is not confirmed. In contrast, in Example 1, the reduction in the intensity of the reflected radiation indicates an increased height of water. Further, in Example 2, the reduction in the intensity of the reflected radiation greater than the reduction in Example 1 indicates a further increase in the height of water as compared to Example 1. Further, in Example 3, the result of the observation on the plane with emitted terahertz radiation at 1 THz indicates that the intensity of the reflected radiation reduced at the particular location of the rear of the forward direction of the block, suggesting that the height of water increases at that location. Because water 5 is absent on the ice 4 at the initial stage in the conditions in Examples 1-3, it is considered that a water film is formed between the ice 4 and the siped block 13 by the slid of the siped block 13 on the ice 4.

INDUSTRIAL APPLICABILITY

As one example, the present disclosure is applicable to determine the thickness of a water film in on-ice behavior tests. As another example, the present disclosure may be used to determine the thickness of a water film on ice on actual road surfaces.

REFERENCE SIGNS LIST

1: Water-on-ice height measurement apparatus
2: Emission device
3: Transmitted radiation measurement device
4: Ice
4a: First surface of ice
4b: Second surface of ice
5: Water
6: Reflected radiation measurement device
7: Tire
8: Rubber block
9a, 9b: Transparent plate
10: Spacer
11: Air
12: Object
13: Siped block

The invention claimed is:
1. A method of measuring a height of water on ice, comprising:
emitting terahertz radiation having a frequency of 10 THz or less toward a first surface of the ice; and measuring transmitted or reflected radiation of the terahertz radiation to measure the height of the water on the ice from a result of the measurement.
2. The method of measuring a height of water on ice according to claim 1, comprising:
emitting the terahertz radiation toward the first surface of the ice from outside the ice on a side of the second surface of the ice, or emitting the terahertz radiation to the first surface from inside the ice; and
measuring the transmitted or reflected radiation of the terahertz radiation to measure the height of the water on the first surface of the ice from the result of the measurement.
3. The method of measuring a height of water on ice according to claim 2, comprising:
emitting the terahertz radiation toward the second surface of the ice from outside the ice on the side of the second surface of the ice, or emitting the terahertz radiation to the first surface from inside the ice, while an object is placed on the first surface of the ice; and measuring the reflected radiation of the terahertz radiation from the object to measure the height of the water between the ice and the object from the result of the measurement.

4. The method of measuring a height of water on ice according to claim 3, wherein the object is made from a rubber.

5. The method of measuring a height of water on ice according to claim 4, wherein the object is one of a tire, a rubber block, and a rubber sheet.

6. The method of measuring a height of water on ice according to claim 1, comprising: emitting terahertz radiation having a frequency of 10 THz or less toward the first surface of the ice or the second surface of the ice; and measuring reflected radiation of the terahertz radiation, and measuring an intensity of the reflected radiation to measure the height of water on the ice from the result of the measurement.

7. The method of measuring a height of water on ice according to claim 1, comprising:
emitting terahertz radiation to water of a known height, and measuring an intensity of transmitted or reflected radiation of the terahertz radiation to obtain a relationship between the height of the water and the intensity of the transmitted or reflected radiation of the terahertz radiation in advance; and
measuring the height of the water on the ice using the relationship obtained in advance.

8. The method of measuring a height of water on ice according to claim 1, comprising: measuring arrival time of the reflected radiation to measure the height of the water on the ice from a speed of the terahertz radiation and the measured arrival time.

9. The method of measuring a height of water on ice according to claim 1, wherein
the method comprises performing the measurement by varying the frequency of terahertz radiation, and
the measurement result comprises measurement results of terahertz radiation of different frequencies.

10. The method of measuring a height of water on ice according to claim 2, comprising: emitting terahertz radiation having a frequency of 10 THz or less toward the first surface of the ice or the second surface of the ice; and measuring reflected radiation of the terahertz radiation, and measuring an intensity of the reflected radiation to measure the height of water on the ice from the result of the measurement.

11. The method of measuring a height of water on ice according to claim 2, comprising:
emitting terahertz radiation to water of a known height, and measuring an intensity of transmitted or reflected radiation of the terahertz radiation to obtain a relationship between the height of the water and the intensity of the transmitted or reflected radiation of the terahertz radiation in advance; and
measuring the height of the water on the ice using the relationship obtained in advance.

12. The method of measuring a height of water on ice according to claim 2, comprising: measuring arrival time of the reflected radiation to measure the height of the water on the ice from a speed of the terahertz radiation and the measured arrival time.

13. The method of measuring a height of water on ice according to claim 2, wherein
the method comprises performing the measurement by varying the frequency of terahertz radiation, and
the measurement result comprises measurement results of terahertz radiation of different frequencies.

14. The method of measuring a height of water on ice according to claim 3, comprising: emitting terahertz radiation having a frequency of 10 THz or less toward the first surface of the ice or the second surface of the ice; and measuring reflected radiation of the terahertz radiation, and measuring an intensity of the reflected radiation to measure the height of water on the ice from the result of the measurement.

15. The method of measuring a height of water on ice according to claim 3, comprising:
emitting terahertz radiation to water of a known height, and measuring an intensity of transmitted or reflected radiation of the terahertz radiation to obtain a relationship between the height of the water and the intensity of the transmitted or reflected radiation of the terahertz radiation in advance; and
measuring the height of the water on the ice using the relationship obtained in advance.

16. The method of measuring a height of water on ice according to claim 3, comprising: measuring arrival time of the reflected radiation to measure the height of the water on the ice from a speed of the terahertz radiation and the measured arrival time.

17. The method of measuring a height of water on ice according to claim 3, wherein
the method comprises performing the measurement by varying the frequency of terahertz radiation, and
the measurement result comprises measurement results of terahertz radiation of different frequencies.

18. The method of measuring a height of water on ice according to claim 4, comprising: emitting terahertz radiation having a frequency of 10 THz or less toward the first surface of the ice or the second surface of the ice; and measuring reflected radiation of the terahertz radiation, and measuring an intensity of the reflected radiation to measure the height of water on the ice from the result of the measurement.

19. The method of measuring a height of water on ice according to claim 4, comprising:
emitting terahertz radiation to water of a known height, and measuring an intensity of transmitted or reflected radiation of the terahertz radiation to obtain a relationship between the height of the water and the intensity of the transmitted or reflected radiation of the terahertz radiation in advance; and
measuring the height of the water on the ice using the relationship obtained in advance.

20. The method of measuring a height of water on ice according to claim 4, comprising: measuring arrival time of the reflected radiation to measure the height of the water on the ice from a speed of the terahertz radiation and the measured arrival time.

* * * * *